(No Model.) 2 Sheets—Sheet 2.
E. THOMSON.
SYSTEM OF ELECTRICAL DISTRIBUTION.
No. 459,423. Patented Sept. 15, 1891.
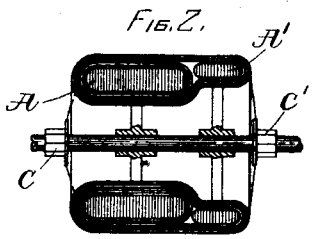
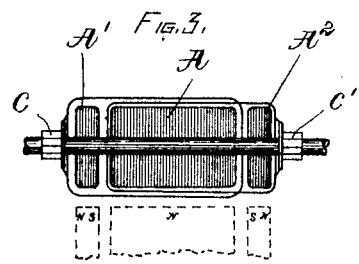
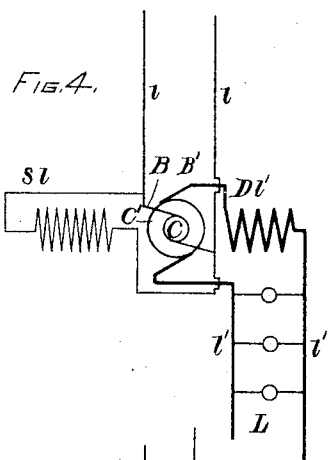
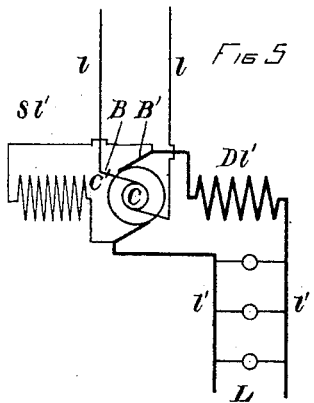
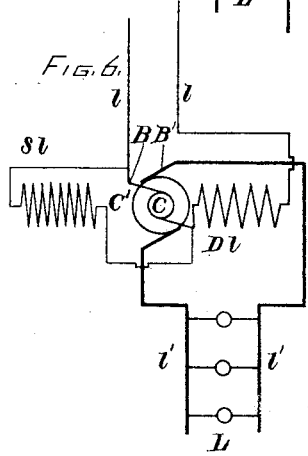
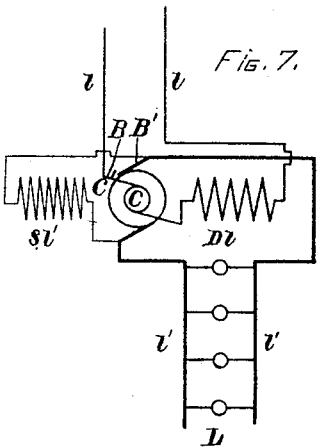
WITNESSES—
A. F. Macdonald
John W. Gibboney
INVENTOR—
Elihu Thomson
by
H. C. Townsend
Atty

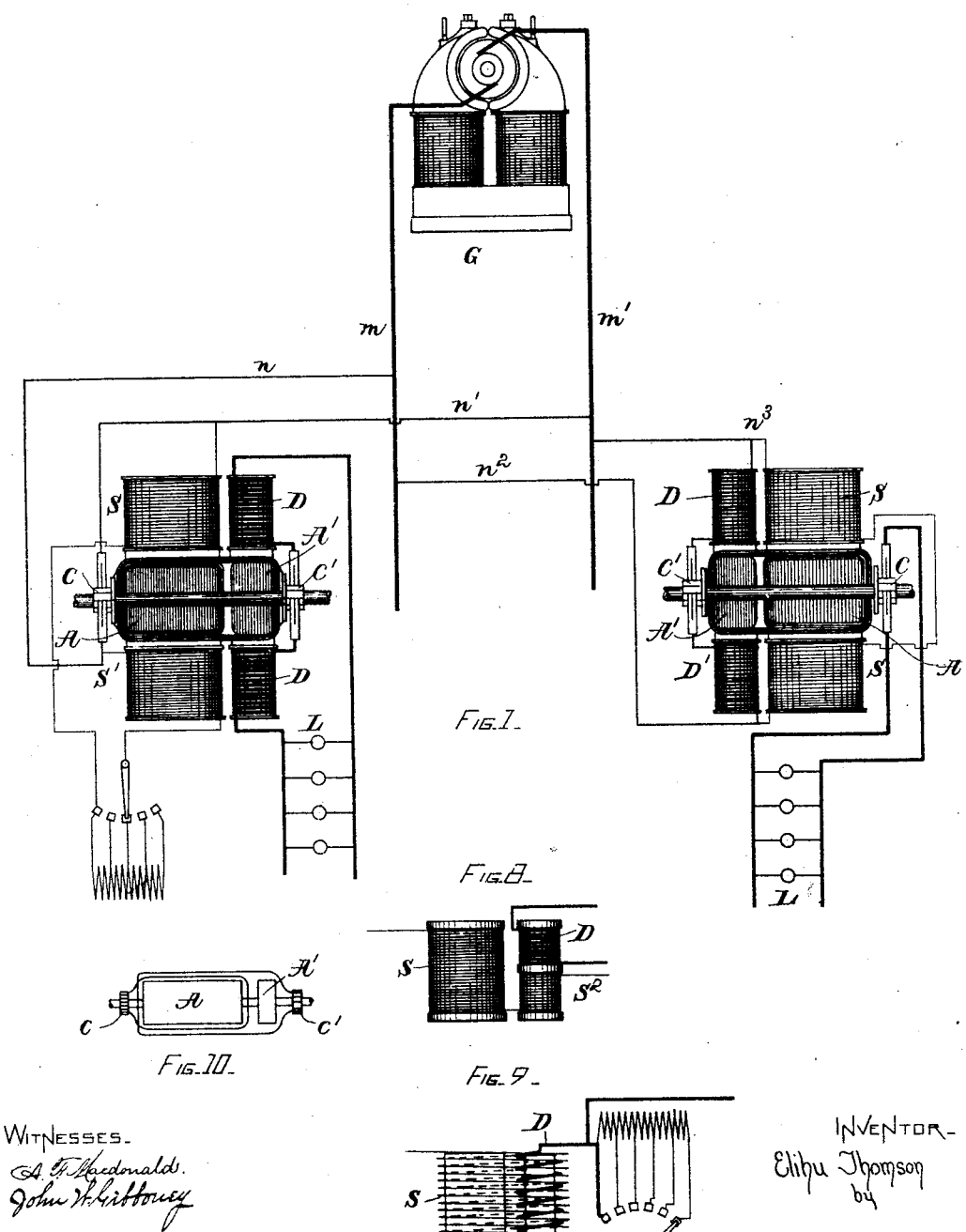

UNITED STATES PATENT OFFICE.

ELIHU THOMSON, OF SWAMPSCOTT, MASSACHUSETTS.

SYSTEM OF ELECTRICAL DISTRIBUTION.

SPECIFICATION forming part of Letters Patent No. 459,423, dated September 15, 1891.

Application filed December 19, 1890. Serial No. 375,197. (No model.)

*To all whom it may concern:*

Be it known that I, ELIHU THOMSON, a citizen of the United States, and a resident of Swampscott, in the county of Essex and State of Massachusetts, have invented a certain new and useful System of Electric Distribution, of which the following is a specification.

My present invention relates more particularly to a system of distribution in which continuous-current transformers are used, and which transformers are compounded or so affected that they compensate for the drop in electro-motive force both on the local lines fed by the transformers and through the transformers themselves and partly on the main line. In continuous-current transformers as hitherto constructed it has been customary either to place two armatures upon the same shaft or connect them together, so as to be driven together, or to wind a single armature with two windings provided with two commutators and brushes and connections, whereby one circuit may inductively produce currents in another circuit while revolving in a magnetic field.

My invention involves a novel method of compounding or regulating the action of a continuous-current transformer under changes of load, as also a novel construction of electric machine adapted for use as a transformer.

Briefly, my invention consists in establishing an armature or armatures which will have a winding upon certain sections of the core, together with another added section of armature-core, which added section of armature-core is not influenced in the same way magnetically as the first or larger section. I produce the differences of magnetic action preferably by subjecting the latter to a magnetic field produced by a current in a direct circuit, (in addition to a shunt-winding in some cases,) while the main portion of the armature-core is affected chiefly by the shunt-circuit, such main and shunt currents operating in the usual way to establish a magnetic field or fields by acting as the exciting-currents flowing in the coils of electro-magnets, which may respectively be termed "direct" and "shunt" magnets. By "direct magnets" I mean those whose coils are in series or direct circuit with armature-coils and the commutator or collector, while by "shunt-magnets" I mean those whose coils are in derivation or in a separate branch from one supply-wire to the other independently of the armature-coils—as, for instance, in usual forms of shunt-wound motors on constant-potential circuits.

My invention consists, further, in the novel method of compounding or regulating the action of a continuous-current transformer, consisting in subjecting one of the armature-windings or sets of windings to the action of an auxiliary magnetic field and varying such field to produce regulation.

My invention consists, further, in subjecting one winding wholly and the other in part to the action of a magnetic field in which the desired transforming action takes place and varying an auxiliary magnetic field for the complementary portion of the armature-winding conductor or armature-conductor acted upon in part by the first-named field.

My invention consists, also, in the general construction of the machine and in other details and combinations hereinafter described and claimed.

The prime object and the important object to be secured by my invention is virtually a changed relation of the effectiveness of the two armature-windings which are inductively related to each other on the core. These armature-windings normally would bear a relation which would produce a certain potential in one circuit from a given potential in another circuit; but under load these relations would have to be varied somewhat and in order to compensate for the drop in potential both in the machine itself and in the mains. Thus, for example, should the windings be of equal potential or of equal effective length under certain conditions, when the conditions of load were changed these windings should become of greater or less effective length relatively one to the other, and this cannot of course be done by adding sections of wire. It must be done by adding magnetic value to one winding and not to the other or reversing a magnetic field which has been operating in one direction on one of the windings.

In the accompanying drawings, Figure 1 shows diagrammatically a system and apparatus embodying my invention. Fig. 2 is a longitudinal section through a transformer-armature constructed in accordance with my invention from an armature of the Gramme or ring type. Fig. 3 illustrates a modification in the number of regulating-magnets. Figs. 4, 5, 6, and 7 are diagrams showing some of the ways in which the field-magnets may be connected for excitation. Fig. 8 illustrates a modification in the winding of the magnets. Fig. 9 shows another modification. Fig. 10 is a diagram illustrating the general relation of the armature circuits, poles, and commutators.

In Fig. 1 we have a diagram illustrating the invention and its application to a system. The generator G is connected by its brushes and circuits in the ordinary way to feed a system of mains $m\ m'$, which mains branch into subsidiary mains or submains $n\ n'\ n^2\ n^3$, as many as may be and located properly to suit the conditions. Thus the generator may be at a distance from the point of work, while the machines, which may be continuous-current transformers which are operated by the current provided by the generator G, may be placed in the immediate locality of the work. This work may be lighting or other electrical work demanding current of definite potential. For such work the generator G would be in a station wherever convenient, sometimes out of a city and by a water site, where the power can be obtained cheaply, while the mains $m\ m'$ would be of high potential and the arrangement for reducing the potential consist of the continuous-current transformer, to be presently described, several of which might be worked upon the same circuit. In these transformers the armature mounted on the shaft to turn freely in its bearings is divided into two sections A A′, and these sections of armature-core are separately wound as follows: The core-portion A is wound with a winding which is connected in the ordinary manner with the commutator or collector C, and the combined sections A A′ are wound with a winding which covers both, and the terminals of which winding are connected to the commutator or collector C′. Either of these commutators or collectors may be selected as the one for feeding the local circuit—that is, they are interchangeable, provided the magnetic relations are changed accordingly, with the field-magnet. In the left-hand transformer of Fig. 1 it will be seen that the commutator C takes current from the submains $n\ n'$ and that the magnets affecting the armature or section of armature A are shown as wound with fine wire coils (marked S S′) and are energized in shunt. They are therefore of fairly-constant magnetism, except for drops of potential in the line. It will also be seen that the connections from the brushes resting on the commutator C′, which is the local-circuit commutator, are carried through and around coils D D′, which affect a separate set of field-poles acting on the armature-section A′ alone. The local circuit passing through the magnet-coils D D′ then passes to the lights or other load which are fed by it. This arrangement may, however, be modified, as shown in the right-hand transformer, Fig. 1. Here the coils D D′ are traversed by the current in the submains $n^2\ n^3$, which practically become the path of a direct current passing through the commutator C′, while the local mains and commutator are connected directly without intervention of any coil between them. This is seen to the right hand of the figure, where the work L is fed direct from the commutator C by a connection to its brushes, while the shunt S S′ is worked, as before, in derivation from the submains $n^2\ n^3$. Now, assuming that the winding on the armature has been properly done, so as to give whatever reduction of potential is required when the load is light, as when there are no lamps burning at L, then this relation will have to be changed whenever the load is thrown on in consequence of a drop which occurs not only in the machine but in the local mains and in the feeding-mains $n\ n'$. It is to compensate for this drop that the accessory portion of the armature A′ and the winding which is upon it come into play. As lights are turned on, the current which flows in the local circuit in the transformer, Fig. 1, will evidently increase, and the coils D D′ will therefore be able to magnetize their cores and affect the armature-core A′ and the coils which correspond—that is, the potential will be raised in the local circuit when the magnetism of the cores D D′ is added to that of the shunt-coils S S′— and tends to enhance the value of the local coil on the armature. This enhanced value is obtained without affecting the value of the other armature-winding, which is connected to the commutator C. The effect would be then equivalent to an increase of the effective length of the local-circuit armature-winding, while maintaining the high-potential or main-circuit armature winding the same. The power to be given to the added field-coils and the added armature-section A′ will depend upon the amount of this increase required to compensate for the drop, and is a matter to be determined in each particular case. It is evident that the effect of the direct coils D D′ in the local circuit is equally well obtained if the winding be finer in case of high potential on the main and the arrangement be that shown to the right hand, Fig. 1. D D′ are in the mains leading through the armature-winding of the machine from the main line $m\ m'$. The effect would be, magnetically, to make the action the reverse of what is shown in the left-hand figure—that is, the added or auxiliary section A′ would be magnetized by the direct coil D D′ in a direction opposite to that of the main cores or magnets S S′ for the reason that the object in this case would be to virtually decrease the effective length as the load comes on, thus decreasing the counter-electro-motive force to flow through the coil or armature-winding connected to the commutator C′, so that therefore the winding connected to the commutator C may be virtually of greater length, the effect being in this case, as before, simply a changed relation of the effective length of the armature-windings, which will compensate for the drop throughout the transformation. While in this figure the auxiliary magnet-cores or auxiliary armature portion which affect only one winding of the armature are shown as wound with a single coil D D', it is evident that it may be a differential winding—that is, that the core might be wound with a portion of the shunt-winding and the direct coil be allowed to act differentially with that winding. This modification is shown in Fig. 8, where the direct winding is wound on a small core, on which is found, also, a shunt-winding $S^2$, which may be in series with the larger shunt-winding S. If the relations of the parts in this case were as in the left-hand transformer, Fig. 1, then at the start the coil $S^2$ would have to be working to produce opposite magnetism to that of S at the same side of the armature, while the coil D would oppose this magnetic effect and gradually reverse it as the current increased. This condition would, however, be reversed if the parts were reversed relatively, as in the right-hand figure of the transformer, Fig. 1—that is, the magnetism of the two shunt-coils S $S^2$ would be in the same direction at the start and would be gradually overcome. Where the effect of the windings S $S^2$, Fig. 8, are to be alike or in the same direction, it is manifest that a single coil can be made, as in Fig. 9, to inclose the large section and small section of core, the small section of core having in addition the direct winding D upon it, which tends to operate in the desired direction to magnetize or demagnetize the core as affected by the shunt-winding.

It will be seen from the foregoing that my present invention includes a novel type of machine, a machine in which the armature is divided, as shown, into sections of armature the relations electrically of the windings of which may be altered with respect to each other. This portion of my invention may be modified to a very considerable extent, and it will not be necessary in the present state of the art to enumerate the numerous modifications. I simply allude to one or two of the more prominent and useful modifications.

Fig. 2, for example, shows a ring-core, the main body of the core being wound with a winding connected to the commutator C, and alongside of it is a similar ring-core A', which is wound over with another winding which is connected to the commutator C'. This armature has, of course, the same properties as the armature shown in Fig. 1, and may be used in a field similar to what is shown in Figs. 1 or 8 and 9.

In Fig. 3 an arrangement is shown in which there are three sections of armature, and the winding overlaps two of them in each case; but the winding connected to the commutator C overlaps the section A' and A, while the winding connected to the commutator C' overlaps the section A $A^2$. In this case three sections of the field-pole are used—N, N S, and S N—the outer smaller poles being made alternately south and north, respectively, and in the desired direction for the two windings, so as to increase or diminish the effect of one with respect to the other, as the need arises. While I have shown these relative windings as wound upon iron bodies of an armature-core, it will be evident, of course, that they need not be so arranged, but that they could be merely constructed of wire to be affected by the field properly; or, in other words, any of the forms of armature which do not contain iron might be made to replace the forms shown if the section of winding be made correspondingly to be influenced by the field in substantially the manner shown in connection with the figures which are herein displayed.

Fig. 4 shows a circuit connection in which the shunt-winding is a connection taken out at S l, taken from the feeding-main l l in shunt to the brushes of the commutator C, which corresponds to one winding on the armature, while the commutator C' is the one which feeds the local mains, and the direct circuit D l' or direct magnet is placed in this circuit, feeding the lights L and the local mains l' l'.

In Fig. 5 the mains l l lead directly to the commutator-brush C without other connection, while the shunt-winding S l' is taken around the local circuit l' l', feeding the lights L L, the main-circuit magnet D' l' being found in this same circuit. This modification will operate satisfactorily, of course, and is practically the equivalent of Fig. 4.

In Fig. 6 the arrangement is changed in the respect that both the fine and coarse winding—that is, the winding S L and D l—are fed directly from the mains l l, while the local circuit or the lighting-circuit l' is fed directly from the commutator-brushes of the commutator C' without other connection.

In Fig. 7 the direct-circuit magnet D l is directly connected to the commutator C from the mains l l, while the shunt-winding S l' is in shunt to the local mains or heavy mains feeding the lights—that is, the mains l' l'. These figures show variations of circuit connections, which of course might be still further modified by taking portions of the figures and combining them—that is, taking a portion of the direct circuit with the mains and with the local or separate portions of the shunt-circuits in shunt to the mains or to the local circuit, various modifications being quite possible.

While I have described my invention as carried out in a machine in which a substantially constant excitation for a portion of the field-magnet is obtained by a shunt-coil taken from a constant-potential main, it should be understood that I do not limit myself to producing the constant field from such a source, as there are other ways well known in the art. I also might produce the variations of current varying with the load in the coil D in any other desired manner, though I prefer to connect them into an armature-circuit for this purpose.

The commutators or collectors C C' may be of any kind known in the art. That one which connects to the local might be constructed to deliver alternating currents to the same; but I do not limit myself as to these details, as the invention consists in the method of regulating or compounding the transformer and in the general combinations of armature circuits and fields.

I do not confine myself to any particular devices for bringing the variable action of auxiliary or exterior field to bear upon one of the transformer-windings, the essence of my invention consisting in varying the relative effective length, potential, or electro-motive capacity of the two windings in the same field by employing an auxiliary or added field, varying the latter, and bringing it into proper inductive relation to one of said windings through the intervention of an electric conductor subject to the action of said auxiliary field and having its potential or electro-motive force varied thereby.

It is obvious that my invention is not confined to applying the regulating action to one winding or circuit of the transformer, and although I claim one in my claims I do not wish to be understood as excluding its simultaneous application to two. It is obvious, however, that if applied to the other side in addition the regulating action would have to be in the opposite way or so as to produce a differential effect, the decrease of effect on one side or circuit being supplemented by the simultaneous increased effect on the other, or vice versa.

What I claim as my invention is—

1. The herein-described method of regulating a continuous-current transformer, consisting in subjecting a separate armature-conductor in circuit with a main winding of the transformer to the action of an auxiliary magnetic field acting only on said separate conductor and varying the strength of said auxiliary field.

2. The herein-described method of regulating a continuous-current transformer, consisting in acting upon both armature-conductors by a substantially constant field or fields and varying the action of a separate field acting only upon a separate armature-conductor or section of conductor in circuit with one of the main conductors.

3. The herein-described method of compounding or regulating a transformer for changes of load, consisting in changing the relative intensities of the magnetic field acting upon the main windings of the transformer, and a field acting upon an extension of the winding of either or both of them, thereby producing an effect equivalent to changing the relative lengths of the windings.

4. The herein-described method of regulating a transformer so as to deliver constant potential at the work, consisting in subjecting a coil or conductor in circuit with one of the transformer-windings, but outside of the magnetic field or fields therefor, to the action of an added or auxiliary field and regulating the action of such field.

5. The herein-described method of producing a change in the relative effectiveness of two circuits or coils inductively related in a transformer and connected, respectively, to main and local wires, consisting in varying the relative strengths of a magnetic field or fields acting upon both coils, and a magnetic field or fields acting upon a coil or coils in circuit with or forming an extension of the circuit of either or both of the first-named coils.

6. In a transformer, the combination, with two armatures or sections of armature A A', of two armature-windings, one wound upon the section A only, the other wound upon both sections A A', and a variable field-magnet acting on the section A'.

7. The combination, substantially as described, of two mechanically-connected armature-cores or sections of cores, a field-magnet for each, an armature-circuit including wires or conductors upon both cores, a collector therefor, a second armature-circuit including wires or conductors upon one of said cores or carriers, a collector therefor, and a magnetizing or demagnetizing coil carrying varying currents and applied to the field-magnet, which acts upon one of the two armature-circuits only.

8. The combination, substantially as described, of two armatures revolving together, one having two armature-windings inductively related, the other having an armature-winding connected into circuit with a winding on the first, and a variable field-magnet acting on the armature having the one winding.

9. In a transformer, the combination, substantially as described, of main and local armature-circuits, a field-magnet common to both and maintained by a shunt-circuit current, an armature-conductor forming an extension of one of said armature-circuits, and an auxiliary field-magnet coil in a direct circuit and acting only upon said extension.

10. The combination, in a transformer, of armature-circuits connected, respectively, to the main and local circuits and both in a substantially constant magnetic field, an extension of one of such armature-circuits, a variable-field-magnet pole acting only upon said extension during revolution of the machine, and a field-magnet coil for the latter field-magnet placed in one of said armature-circuits.

11. In a transformer, the combination, substantially as described, of means for producing a constant or substantially constant field, and two transformer-circuits, one wholly and the other partially located in said field, as and for the purpose described.

12. In a transformer, the combination, with the main-field pole-piece and armature or armatures, of an auxiliary or added section of armature core or carrier bearing a portion of the circuit which includes a conductor in the field of induction for both circuits of the transformer, and a separate field-magnet pole-piece for such added section.

13. In a transformer, the combination, with the main-field magnet and armature, of an auxiliary or added section of armature core or carrier carrying a part of one transformer-circuit, a field-magnet pole-piece for such added section, and a coil for such added field-magnet carrying current varying with the load.

14. The combination, substantially as described, of a conductor wound upon both of two armatures-cores or sections of core, a collector therefor, a conductor wound upon one core or section of core only, a collector therefor, and means for revolving both cores together, a field-magnet acting upon both conductors, and a separate field-magnet acting upon one of them.

15. The combination, with two revolving armature-conductors mounted upon connected revolving carriers or supports and connected to separate circuits, of a field-magnet acting on a portion of one of said conductors, and a field-magnet producing a field in which both of said conductors revolve.

16. The combination of two sets of armature-conductors connected to separate circuits, a field-magnet of comparatively constant effect in whose field both of said sets of conductors revolve, an added conductor or extension of conductor connected to one of the first to assist or oppose the electro-motive force of the same, and a separate variable field-magnet acting during revolution of the machine only upon such added conductor, as and for the purpose described.

17. The combination of two armature-circuits and corresponding collectors connected to revolve together and two field-magnets, one of comparatively constant strength producing a field acting upon both armature-circuits and the other of variable strength producing a field which acts upon a conductor electrically united with a conductor subject to the action of the first field.

18. The combination of two sets of armature-conductors and inductively related in the machine, a field-magnet having an exciting-coil carrying a constant current and furnishing a field for both said conductors, and a variable field-magnet for a conductor electrically connected to the circuit of one of the first-named conductors, said latter magnet having two exciting-coils acting differentially upon it.

19. The combination, in a transformer having two sets of armature-conductors wound on the same core or carrier, of an added or auxiliary armature core or carrier or section of core or carrier having armature-conductors forming a part of a circuit of one of the first-named sets of conductors, a nearly constant field-magnet for the first-named core or carrier, and a field-magnet for the second or added core or carrier having two coils, one carrying constant current and the other current varying with the work.

20. In a continuous-current transformer, the combination, substantially as described, of means for producing a field of induction, two armature circuits or conductors adapted to revolve therein, an auxiliary field-magnet, and an extension of one of said conductors in the field of the latter, as and for the purpose described.

21. As a means for delivering constant potential at the work, the combination, with main and local transformer-windings, of means for subjecting the same to the action of magnetism derived from any suitable source, an accessory winding in circuit with one of the former, and means for producing a magnetic field for said accessory winding, variable with the potential of the local, as and for the purpose described.

22. The herein-described method of regulating or compounding a transformer, consisting in subjecting the transformer-windings and an accessory winding or conductor in circuit with either or both of them to the action of independent magnetic fields and varying the relative strengths of said fields.

23. The herein-described method of varying the relative potential or effective length of the two windings in the same magnetic field of a transformer, consisting in varying an auxiliary or exterior magnetic field variable independently of the main field for the transformer, but inductively related to said transformer, as and for the purpose described.

Signed at Lynn, in the county of Essex and State of Massachusetts, this 15th day of December, A. D. 1890.

ELIHU THOMSON.

Witnesses:
JOHN W. GIBBONEY,
W. O. WAKEFIELD.